(12) United States Patent
Fuhrmann

(10) Patent No.: US 7,849,284 B2
(45) Date of Patent: Dec. 7, 2010

(54) MESSAGE MEMORY FOR A COMMUNICATION PROTOCOL AND METHOD

(75) Inventor: Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 1233 days.

(21) Appl. No.: 10/557,632

(22) PCT Filed: May 10, 2004

(86) PCT No.: PCT/IB2004/050625

§ 371 (c)(1),
(2), (4) Date: Nov. 17, 2005

(87) PCT Pub. No.: WO2004/105328

PCT Pub. Date: Dec. 2, 2004

(65) Prior Publication Data

US 2006/0282640 A1 Dec. 14, 2006

(30) Foreign Application Priority Data

May 21, 2003 (EP) .................................. 03101445

(51) Int. Cl.
*G06F 12/00* (2006.01)

(52) U.S. Cl. .................. 711/170; 711/171; 711/205; 711/217; 711/220

(58) Field of Classification Search .................. 711/170, 711/171, 205, 217, 220
See application file for complete search history.

(56) References Cited

U.S. PATENT DOCUMENTS

| 6,128,713 | A | * | 10/2000 | Eisler et al. | 711/159 |
| 6,247,042 | B1 | * | 6/2001 | Engstrom et al. | 718/107 |
| 2002/0046305 | A1 | * | 4/2002 | Babaian et al. | 710/5 |
| 2005/0057560 | A1 | * | 3/2005 | Bibr et al. | 345/418 |
| 2008/0137679 | A1 | * | 6/2008 | Horst et al. | 370/428 |
| 2008/0140949 | A1 | * | 6/2008 | Hartwich et al. | 711/154 |

FOREIGN PATENT DOCUMENTS

EP 1 087 298 * 3/2001
WO WO2004105328 A * 12/2004

* cited by examiner

*Primary Examiner*—Kevin L Ellis
*Assistant Examiner*—Mehdi Namazi

(57) ABSTRACT

A message memory (1) with a flexible association between the message-object memories of the message memory (2) and the segments of a physical memory (3). The association is made through configuration, wherein one or more memory segments form a cluster as a function of the length of the message content to be stored.

12 Claims, 2 Drawing Sheets state of the art

MESSAGE MEMORY FOR A COMMUNICATION PROTOCOL AND METHOD

The invention relates to communications systems that transfer an identifiable message with an associated data field for every transmission event. In particular, it relates to the transfer of messages with a configurable data-field length, which, however, is defined at a particular value for the particular system design.

The structure of a communication interface is known from message-transmission systems, as used in automotive engineering or, generally, for distributed automatic control engineering applications. Used for a message transmission system of this kind is, for example, the CAN (Controller Area Network) bus.

Figure 1:
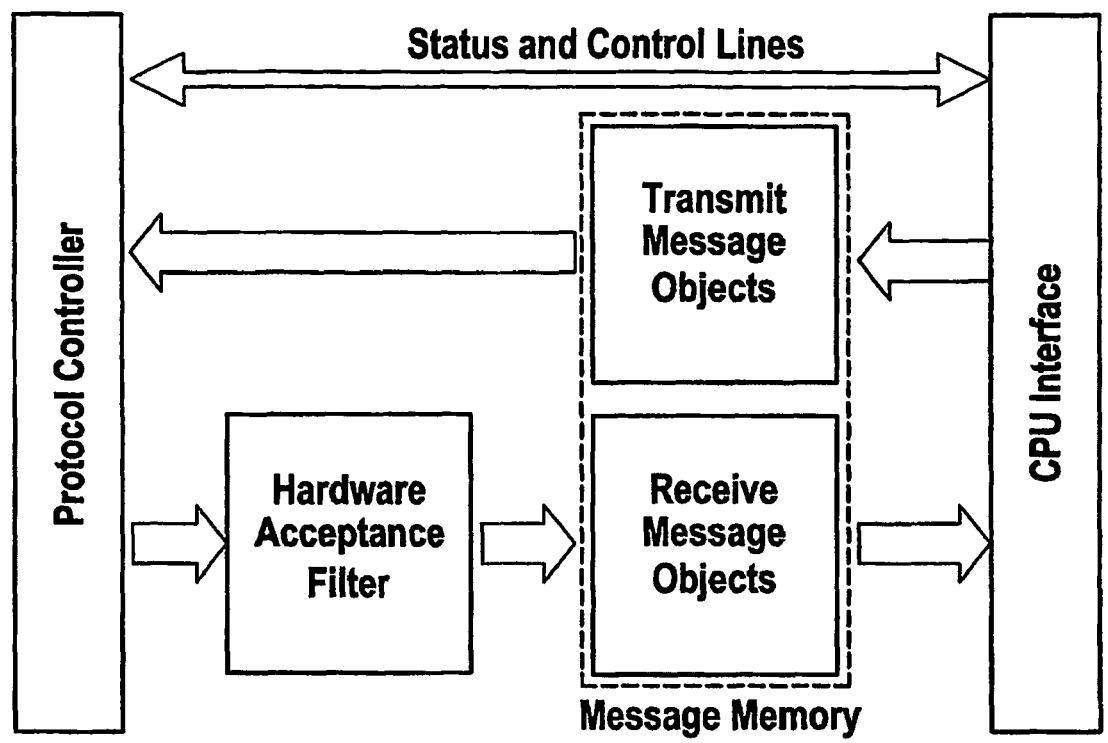

FIG. 1 shows, from the prior art, a communication interface, which typically comprises a protocol controller, a hardware acceptance filter, the message memory, which is divided into two areas for message objects received and to be transmitted, a CPU (central processing unit) interface and a signal interface for control signals and monitor signals, or status signals, between the CPU interface and the protocol controller (status and control lines). The protocol controller realizes the message transmission in accordance with the communication mechanisms prescribed for a transmission protocol. This means that the protocol controller, while adhering to the media access control, controls the transmission and reception of messages that exhibit a uniform format as regards the message structure and the coding. The media access control comprises mechanisms of the first (physical) layer and the second (data link) layer of the OSI 7-layer model. Received message data for the particular application, i.e. for the particular software running on the CPU, is made available via the CPU interface. In addition, the application can forward data, via the CPU interface, to the communication interface, which is then transmitted in accordance with the communication protocol (e.g. CAN bus). A message memory is provided in order to relieve the load on the CPU or the application software. This makes available a number of message-memory objects, which are provided for the purpose of transmitting message data or receiving and storing message data.

The message itself, or its content, is identifiable and distinguishable in certain communications systems on reception, by means of an additionally transmitted identification (ID) or by the time of arrival (this involves, for example, TDMA (Time Division Multiple Access) systems). This concerns communications systems such as CAN (see ISO Standard: ISO 11898:1993(E) "Road Vehicles, Interchange of digital information—controller area network (CAN) for high speed communications", November 1993), FlexRay (see "FlexRay Requirements Specification", version 2.0.2, April 2002, FlexRay, Consortium; www.flexray.com) or TTP/C (see "TTP/C Specification", version 0.5 Edition 0.1.21, July 1999, TTTech Computertechnik AG; http://www.tttech.com). In communications systems of this kind, message-object memories, which accommodate only very specific messages, may be provided in the communication interface by means of the message memory. An optional filter unit (hardware acceptance filter) deals with the representation or storage of a special message or group of messages on a message object. A construction of this kind is known from CAN systems under the name of "Full CAN" implementation. Likewise, one or more message-object memories may be made available for the transmission device.

The message memory described, with its message-object memories, is known for message-transmission systems that support a number of data bytes defined by the specification of the transmission protocol, or else may permit only one variation to a small degree, wherein the variation means, for example, that the CAN message contains a maximum of 8 bytes.

For message-transmission systems with a specified data-field length, the message-object memories are organized in such a way that they always permit the storage of a message with the maximum data-field length. With a given physical memory, for example a RAM (Random Access Memory), a specific, limited number of message-object memories can thereby be realized. A 1:1 replication of the logical organization onto the physical memory thereby takes place. If the physical memory is divided into (k+1) fields of 8 bytes, the message memory also exhibits (k+1) fields. The number of message-object memories is therefore a fixed variable for a conventional message memory as described. So, in order to expand the number of message-object memories, an enlargement of the physical memory is necessary, i.e. the use of a larger or an additional physical memory, giving rise to higher costs.

For short messages, the fixed association between message-object memories and physical memory can be implemented without maintaining an excessively high memory overhead in the message memory, albeit that messages with shorter data fields are stored in message-object memories with a larger data capacity, i.e. ability to store a certain data field.

With the introduction of communications systems that permit, for the length L of the data field, a higher value range (L>8 bytes), this concept of defined object size and object quantity meets its limitations. For example, the FlexRay communication protocol supports messages with a data field of a length up to more than 200 bytes. The length of the messages for the static segment is hereby configurable in a transmission cycle, i.e. it can be defined for a special application between 0 bytes and the maximum value.

In accordance with the previous concept, an implementation would have to make available a defined number of message-object memories, wherein each of the message-object memories supported the storage of message contents of the theoretical maximum length. For a FlexRay system, however, which, for a specific application, operates in practice only with data fields of, for example, 32 bytes, this would mean that the chip implementation kept available a large quantity of unused memories, and was therefore suboptimal as regards the price/performance ratio. In the extremely cost-sensitive application field of automotive electronics, this is not acceptable. On the other hand, a chip implementation supporting only the storage of messages with a maximum 32 bytes could not be used for all application areas. This leads to reduced sales results for a particular product, and so should not be aimed for either.

It is therefore an object of the invention to specify a message memory that can be used with only one implementation for applications with different specific requirements as to the quantity and size of the available message-object memories. It is further an object of the invention to specify a method of defining the association between the logical representation and the physical memory that optimizes the use of the memory.

This object is achieved in accordance with the invention by a message memory equipped with:

a logical, virtual memory representation for a configurable number of message-object memories and their data capacity for the storage of message contents, a physical memory divided into a specific number of segments, wherein the length of the individual message-object memories and their association with the segments of the physical memory are configurable. In this context, configurable means that the parameters for the running time of an application are defined.

On the basis of its physical structure, this message memory makes available a restricted number of logical, virtual representations for use by the protocol controller or CPU. The message memory is hereby divided into a specific number of message-object memories with a specific data capacity. This division, which of course always has to be reproducible on the physically present memory, is to be flexibly organized, so that a configuration optimized for specific use in an application in terms of the quantity of message objects and their data capacity can always be selected, i.e. configured.

A message-object memory hereby takes the form of a cluster of multiple memory segments. The length of the individual segments is as short as possible, e.g. 8 bytes long. If message contents with a length o of more than 8 bytes are transferred in an application, a corresponding number p of memory segments is created such that: o bytes<p*8 bytes.

The predetermined configurations are preferably defined in the application software.

The flexible association between the message-object memories and the physical memory enables the optimum exploitation of the memory capacity, since the fewest possible unused memories are maintained for one chip implementation. Message-object memories that are optimized in terms of quantity and length are hereby made available for the running time of the system for a communication protocol equipped with a data field that is configurable in length. In this context, optimized means that the physical memory is used as efficiently as possible, i.e. that the fewest possible empty memory segments are present.

The configuration of the logical, virtual memory representation is undertaken by an addressing unit, which converts the logical address of a memory location into the physical access address.

Different conversion algorithms or strategies may be used hereby. If the flexibility of configuration options is restricted to the effect that the number of message-object memories and their memory capacity (i.e. the data-field length) can be set only proportionally and in powers of 2, the address conversion may be realized by simple shifting operations (by a configurable number of address bits), as demonstrated in the following embodiment example.

Further, more flexible address conversion mechanisms, such as the use of pointer arrays (memory field with address pointers), which point to the start address of a message-object memory, or segmented addressing, can enable even more flexible segmentation of the message memory, i.e. more complex associations between the logical, virtual memory representation and the physical memory. On the basis of the necessary complexity in the circuit realization and the costs associated therewith, as well as the given requirements as to configuration flexibility, the selection of the address conversion strategy must be in line with different applications.

The object of the invention is further achieved by means of a method of defining the association between the logical representation and the physical memory for a message memory equipped with:

a logical, virtual memory representation for a configurable number of message-object memories and their data capacity for the storage of message contents, a physical memory divided into a specific number of segments, with the following steps:

determination of the length of a message content in bytes, selection of a number of memory segments per cluster as a function of the byte length of the message content, wherein a cluster forms a message-object memory.

The determination of the length of the message content may take place offline or alternatively online. In this case, offline means that, during the programming of the application software, the association between the logical representation and the physical memory is known for a message memory and matched to the data-field length of the messages. The number and data capacity of the message-object memory are known a priori. Online in this case means that the data-field length of the messages in the communication interface is not established until during the running time of the system, by observation of the occurrence of the communication and, matched to this, by defining the association between the logical representation and the physical memory for a message memory.

The communications system in accordance with the invention is preferably used in applications in the automotive field, in order to control safety-relevant processes.

The invention will be further described with reference to examples of embodiments shown in the drawings, to which, however, the invention is not restricted.

FIG. 1 shows example configurations of a message memory with flexible association between the message-object memories and the physical memory.

Figure 2:
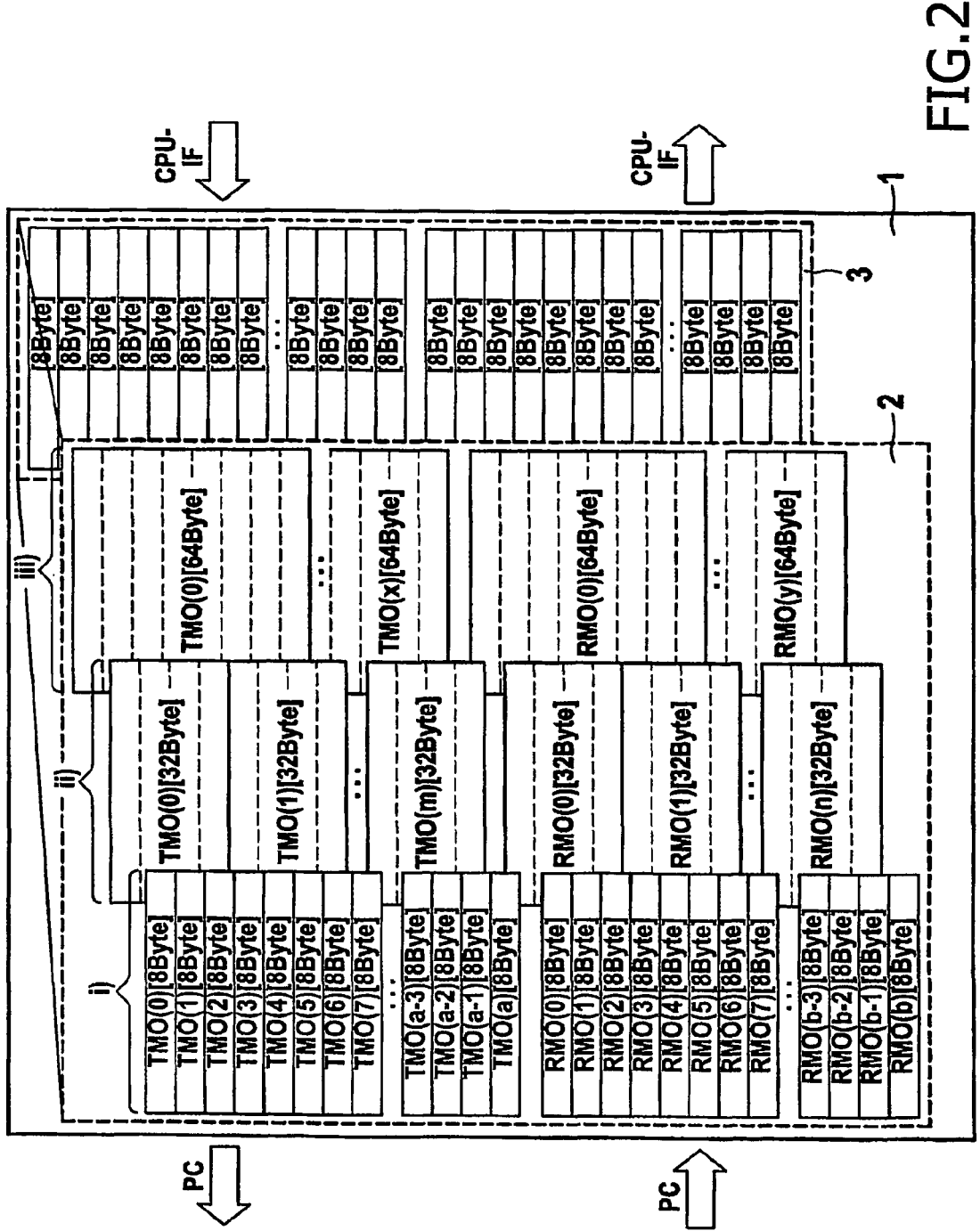

FIG. 2 shows example configurations of a message memory 1 with flexible association between the logical, virtual memory representation 2 and the physical memory 3. The physical memory 3 has a structure of (a+b+2)*8 bytes. The maximum number of message-object memories represents the first configuration i):

i) Transmission direction: (a+1) message-object memory with a data field of 8 bytes Reception direction: (b+1) message-object memory with a data field of 8 bytes If the transmission protocol uses a larger data field for the exchange of messages, the number of available message-object memories is smaller, since the physical memory 3 is divided into larger clusters. The second configuration ii) shows an example:

ii) Transmission direction: (m+1) message-object memory with a data field of 32 bytes Reception direction: (n+1) message-object memory with a data field of 32 bytes where: m<a and n<b.

The third configuration iii) is shown as a further example:

iii) Transmission direction: (x+1) message-object memory with a data field of 64 bytes Reception direction: (y+1) message-object memory with a data field of 64 bytes where: x<m<a and y<n<b.

The physical memory 3 may be, for example, an external memory or an "on chip" memory. Both the CPU interface CPU_IF and the protocol controller PC access the physical memory 3 via the logical, virtual representation 2 of the message memory 1.

Depending on the size of the data field of the message, an algorithm selects a suitable configuration. The configuration of the logical memory representation 2 and the conversion strategy are explained below for the 3 example configurations i), ii) and iii) with reference to an example. The example is based on the following properties of the physical memory 3:

The capacity is 256 bytes

The addressing is byte-oriented and ascending; the address area is given in binary notation and is $00000000_2 \ldots 11111111_2$.

The physical address is shortened to phyadr.

The configuration of the logical memory 2 is then as follows for the configuration examples:

i) 32*8 bytes, i.e. 32 message-object memories (N0-N31) with 8 bytes data capacity ii) 8*32 bytes, i.e. 8 message-object memories (N0-N7) with 32 bytes data capacity iii) 4*64 bytes, i.e. 4 message-object memories (N0-N3) with 64 bytes data capacity.

The data capacity of a message-object memory is its ability to store a data field of a certain length.

The conversion strategy is as follows:

The physical address phyadr is composed of 2 parts—the message object MO and the data bytes DB: phyadr=MO|DB where:

MOadr: logical address of the message-object memory ($00000_2$-$11111_2$)

DBadr: logical, relative byte address in the message-object memory ($000000_2$-$111111_2$).

For MOadr and DBadr, the number of address bits to be selected in an implementation is determined for this configuration example by the maximum upper limit of the address space, which may derive from various adjustable configurations. In the given configuration example, 5 bits are required to represent MOadr, and 6 bits to represent DBadr.

The physical address phyadr is constructed for the configuration examples as follows, from the two components MO and DB in accordance with a corresponding shift operation or bit selection:

i) MO comprises 5 bits (5 least significant bits of MOadr); DB comprises 3 bits (3 least significant bits of DBadr);

Example: Message Object 4, Data Bytes 0: MOadr=$00100_2$, DBadr=$000000_2$>>MO=$00100_2$, DB=$000_2$; phyadr=$00100|000_2$ ii) MO comprises 3 bits (3 least significant bits of MOadr); DB comprises 5 bits (5 least significant bits of DBadr);

Example: Message Object 7, Data Bytes 31: MOadr=$00111_2$, DBadr=$011111_2$>>MO=$111_2$, DB=$11111_2$; phyadr=$111|11111_2$ iii) MO comprises 2 bits (2 least significant bits of MOadr); DB comprises 6 bits (6 least significant bits of DBadr);

Example: Message Object 3, Data Bytes 63: MOadr=$00111_2$, DBadr=$111111_2$>>MO=$11_2$, DB=$111111_2$; phyadr=$11|111111_2$ The advantage is that the access of the protocol controller PC or of the CPU interface CPU_IF to the message memory 1 can always take place via the logical, virtual memory representation 2 independently of the configuration using the same address tuple (MOadr, DBadr).

The proposed, configurable message memory 1 may be used as both a transmitting and a receiving buffer. It is independent of the filtering strategy followed, which determines the allocation of messages to specific message-object memories.

The status information and the control information relating to a message-object memory may alternatively:

a) be regarded as part of the scalable message-object memory, or b) be stored separately, e.g. in a register field.

Alternatives a) and b) depend on the access modes to be supported by the hardware realization for this part of the message information.

The base granularity, i.e. the configurable increment for the data capacity of a message-object memory, and the minimum size of a message-object memory may be selected depending on the typical application requirements, the available physical memory structure (addressability, block access) and the desired or accepted complexity for the address conversion from logical memory to physical memory.

The invention claimed is:

1. A message memory equipped with:
   a logical, virtual memory representation for a configurable number of message-object memories and their data capacity for the storage of message contents,
   a physical memory divided into a specific number of segments,
   characterized in that the data capacity of the individual message-object memories and their association with the segments of the physical memory are configurable,
   wherein a physical access address of the physical memory comprises least significant bits from a logical address of a message-object memory and least significant bits from a logical byte address within the message-object memory.

2. A message memory as claimed in claim 1, characterized in that a message object takes the form of a cluster of multiple memory segments.

3. A message memory as claimed in claim 1, characterized in that predetermined configurations are defined in the application software.

4. A message memory as claimed in claim 1, wherein the physical access address of the physical memory comprises the five least significant bits from the logical address of the message-object memory and the three least significant bits from the logical byte address within the message-object memory.

5. A message memory as claimed in claim 1, wherein the physical access address of the physical memory comprises the three least significant bits from the logical address of the message-object memory and the five least significant bits from the logical byte address within the message-object memory.

6. A message memory as claimed in claim 1, wherein the physical access address of the physical memory comprises the two least significant bits from the logical address of the message-object memory and the six least significant bits from the logical byte address within the message-object memory.

7. A method of defining the association between the logical representation and the physical memory for a message memory equipped with:
   a logical, virtual memory representation for message-object memories with a plurality of data fields for the storage of message contents,
   a physical memory divided into a specific number of segments,
   characterized by the following steps:
       determination of the length of a message content in bytes,
       selection of a number of memory segments per cluster as a function of the byte length of the message content, wherein a cluster forms a message-object memory,
   wherein a physical access address of the physical memory comprises least significant bits from a logical address of a message-object memory and least significant bits from a logical byte address within the message-object memory.

8. The method of claim 7, wherein the physical access address of the physical memory comprises the five least significant bits from the logical address of the message-object memory and the three least significant bits from the logical byte address within the message-object memory.

9. The method of claim 7, wherein the physical access address of the physical memory comprises the three least significant bits from the logical address of the message-object memory and the five least significant bits from the logical byte address within the message-object memory.

10. The method of claim 7, wherein the physical access address of the physical memory comprises the two least significant bits from the logical address of the message-object memory and the six least significant bits from the logical byte address within the message-object memory.

11. A message memory equipped with:
a logical, virtual memory representation for a configurable number of message-object memories and their data capacity for the storage of message contents,
a physical memory divided into a specific number of segments,
characterized in that the data capacity of the individual message-object memories and their association with the segments of the physical memory are configurable,
wherein the number of address bits of a logical address of a message-object memory and the number of address bits of a logical byte address within the message-object memory are determined by the maximum upper limit of an address space of the message memory.

12. A message memory as claimed in claim 11, wherein an access of a protocol controller or of a central processing unit interface to the message memory takes place via the logical, virtual memory representation independently of the configuration of a) logical addresses of the configurable number of message-object memories and b) logical byte addresses within the configurable number of message-object memories.

* * * * *